(12) United States Patent
Miyasaka et al.

(10) Patent No.: US 6,183,908 B1
(45) Date of Patent: Feb. 6, 2001

(54) NEGATIVE ELECTRODE MATERIAL FOR NONAQUEOUS SECONDARY BATTERY AND NONAQUEOUS SECONDARY BATTERY COMPRISING SAME NEGATIVE ELECTRODE MATERIAL

(75) Inventors: Tsutomu Miyasaka; Shigeru Nakamura, both of Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/033,704

(22) Filed: Mar. 3, 1998

(30) Foreign Application Priority Data

Mar. 14, 1997 (JP) .................................... 9-061250

(51) Int. Cl.[7] .............................. H01M 4/58; H01M 4/48
(52) U.S. Cl. .................................... 429/218.1; 429/231.1; 423/618
(58) Field of Search ............................. 429/218.1, 231.1; 423/618

(56) References Cited

U.S. PATENT DOCUMENTS

| | | |
|---|---|---|
| 5,284,721 | * 2/1994 | Beard . |
| 5,472,810 | 12/1995 | Takeuchi et al. . |
| 5,567,539 | * 10/1996 | Takahashi et al. ...................... 429/57 |
| 5,601,952 | * 2/1997 | Dasgupta et al. ..................... 429/224 |
| 5,604,057 | 2/1997 | Nazri .................................... 429/224 |
| 5,820,790 | * 10/1998 | Amine et al. ..................... 252/519.1 |
| 5,958,624 | * 9/1999 | Frech et al. ..................... 429/231.95 |

* cited by examiner

*Primary Examiner*—Maria Nuzzolillo
*Assistant Examiner*—Tracy Dove
(74) *Attorney, Agent, or Firm*—Sughrue, Mion, Zinn, Macpeak & Seas, PLLC (57) ABSTRACT

The present invention provides a lithium ion nonaqueous secondary battery having a high discharge capacity and excellent high rate characteristics. A novel negative electrode material for a lithium ion nonaqueous secondary battery is disclosed, comprising a composite metal oxide containing an amorphous structure synthesized by a sol-gel method.

4 Claims, 2 Drawing Sheets

NEGATIVE ELECTRODE MATERIAL FOR NONAQUEOUS SECONDARY BATTERY AND NONAQUEOUS SECONDARY BATTERY COMPRISING SAME NEGATIVE ELECTRODE MATERIAL

FIELD OF THE INVENTION

The present invention relates to a negative electrode material for a lithium ion nonaqueous electrolyte secondary battery having a high capacity and an improved charge-discharge characteristics and a lithium ion nonaqueous secondary battery using the negative electrode material.

BACKGROUND OF THE INVENTION

In recent years, the demand for the capacity increase and size reduction of the secondary batteries has been growing with the spread of portable personal computers and portable telephones. To this end, the development of lithium ion secondary batteries having a high capacity has been widely made.

As positive electrode materials for a lithium ion secondary battery there have been widely used $LiCoO_2$, $LiCo_{1-x}Ni_xO_2$, $LiNiO_2$, and $LiMn_2O_4$ which are positive electrode materials for the secondary battery having a high potential. On the other hand, as negative electrode materials there have been normally used carbonaceous materials. Such the carbonaceous material acts as an electrode active material which reversibly intercalate and deintercalate lithium ion during charging and discharging and thus constitutes a so-called rocking chair type secondary battery electrochemically connected with a nonaqueous electrolytic solution or solid electrolyte.

Examples of carbonaceous materials to be commonly used as negative electrode materials include graphite-based carbon material, pitch coke, fibrous carbon, and high capacity type soft carbon calcined at a low temperature. However, carbonaceous materials are disadvantageous in that they have a low specific gravity of 2.26 (graphite). Therefore, if they are used in an amount such that lithium intercalating capacity reaches the stoichiometric limit (372 mAh/g), it is difficult to design the battery capacity as high as desirable. As negative electrode active materials having a high capacity density surpassing the carbonaceous materials there have been disclosed negative electrode active materials made of a composite oxide mainly composed of tin oxide in JP-A-6-60867, JP-A-7-220721, JP-A-7-122274, and JP-A-7-288123 (the term "JP-A" as used herein means an "unexamined published Japanese patent application"). Processes for preparing these negative electrode active materials are also disclosed in the above cited patents.

These composite oxide negative electrode materials are synthesized by calcining at a high temperature of 1,000° C. or more.

However, the foregoing synthesis process has a handling problem in production due to corrosion on the synthesis container. Further, the contamination by impurities eluted from the container causes variation of the physical properties of the electrodes. The material prepared by a melting method is ground to adjust its particle diameter before use as an active material for the battery. However, the material thus ground is liable to wide distribution of particle diameter that can be-a factor for instabilizing the battery performance. Further, since the group of particles having such the wide diameter distribution has a relatively small surface area, the effective surface area taking place in the intercalating reaction of lithium ion decreases, reducing the high current charge-discharge (high rate) efficiency and capacity of the battery. Moreover, in the melting method, various starting material powders, i.e., metal oxide powders are each melted, and then mixed in the form of dispersion. Therefore, it is difficult to uniform the metal elements on a molecular basis, making it difficult to uniformilize the composition distribution in the particle. There have been an apprehension that such a uniformity problem can affect the stability of charge-discharge characteristics of negative electrode materials.

SUMMARY OF THE INVENTION

An object of the present invention is to provide a lithium ion nonaqueous electrolyte secondary battery which comprises a negative electrode material having a uniform particle size and intraparticle composition distribution to exhibit improved charge-discharge characteristics.

Another object of the present invention is to provide a secondary battery which is excellent in performance stability and high rate efficiency.

A further object of the present invention is to provide a secondary battery favorable for production cost as well.

These and other objects of the present invention will become more apparent from the following detailed description and examples.

The foregoing objects of the present invention are accomplished by providing a negative electrode material for a lithium ion nonaqueous secondary battery comprising a composite metal oxide containing an amorphous structure synthesized by a sol-gel method.

In accordance with a representative preparation process of the present invention, a negative electrode material for a lithium ion nonaqueous secondary battery having improved properties can be prepared, comprising a composite oxide containing an amorphous structure which comprises tin as a main component and at least one element selected from the group consisting of elements belonging to the groups I, II, XIII, XIV and XV in the periodic table, transition metal elements and halogen elements, at least a part of the composite oxide having been synthesized from a tin-containing compound as a starting material by a sol-gel method. dr

BRIEF DESCRIPTION OF THE DRAWINGS

By way of example and to make the description more clear, reference is made to the accompanying drawings in which:

FIG. 2 is a sectional view of a cylindrical nonaqueous secondary battery prepared according to an example of the present invention, wherein the reference numeral 1 indicates a negative electrode sealing plate, the reference numeral 2 indicates a pelletized negative electrode material mixture, the reference numeral 3 indicates a separator, the reference numeral 4 indicates a pelletized positive electrode material mixture, the reference numeral 5 indicates a current collector, the reference numeral 6 indicates a positive electrode case, the reference numeral 8 indicates a positive electrode sheet, the reference numeral 9 indicates a negative electrode sheet, the reference numeral 10 indicates a separator, the reference numeral 11 indicates a battery can, the reference numeral 12 indicates a battery lid, the reference numeral 13 indicates a gasket, and the reference numeral 14 indicates an explosion-proof valve.

DETAILED DESCRIPTION OF THE INVENTION

In the present invention, a sol-gel method is used to prepare a negative electrode material comprising a composite oxide.

The sol-gel method involves the preparation of a sol, i.e., colloid dispersion before the production of a group of solid particles having properly-controlled particle size and particle size distribution. Modern techniques for the production of a sol containing a metal oxide are described in E. Matijevic, "Surface and Colloid Science", Vol. 6, John Wiley and Sons, 1973. The production of a metal oxide sol normally involves prolonged heat treatment of a metal salt in the presence of a strong acid such as sulfuric acid and phosphoric acid that causes hydrolysis of the metal salt, resulting in the precipitation of an oxide fine particle. As a method for causing gelation of the amorphous metal oxide to be used herein there has been known a process for the preparation of glass by a sol-gel method.

Representative examples of the process for the preparation of glass by a sol-gel method include a process which comprises hydrolyzing a metal alkoxide in the presence of an acid or alkali catalyst to prepare the metal alkoxide gelatinized in the form of sol; a process which comprises adding water to a particulate starting material such as silica to obtain a hydrosol which is then allowed to stand to obtain gel; and a process which comprises adding a particulate starting material to a sol solution of the foregoing hydrolyzate of metal alkoxide to adjust the pH value of the sol close to neutrality so that the sol is subjected to gelation. In the case of preparation of glass made of a composite oxide of a plural metals, an alkoxide containing various metal elements and an acid or alkali salt may be subjected to reaction in an aqueous solution in the stoichiometric proportion to give a product which is then pH adjusted in the form of gel. The glass fine particle of composite metal oxide thus prepared is a product synthesized by a reaction on a molecular basis and thus has a uniform composition as compared with a product obtained by the melt method.

Another process for the preparation of a fine particle by a sol-gel method comprises forming a sol into droplets at an oil-water interface developed by addition of a surface active agent, and then treating the droplets with an alkali to cause gelation as disclosed in JP-A-64-42316.

In the hydrolysis of a metal alkoxide generally known as sol-gel method, an acidic catalyst is used as a sol-forming catalyst. As the gelation catalyst there may be used a basic catalyst. Examples of the acidic catalyst include sulfuric acid, hydrochloric acid, nitric acid, acetic acid, oxalic acid, formic acid, propionic acid, benzoic acid, glycolic acid, maleic acid, citric acid, and toluenesulfonic acid. In general, the pH value of the reaction system is adjusted to not more than 3 with such the acidic catalyst before sol formation. As the basic catalyst for gelation there may be effectively used sodium hydroxide, ammonium hydroxide, quaternary ammonium salt, amine, formamide, oxalic acid or the like. The basic catalyst may be added in an amount required to adjust the pH value of the reaction system to not less than 7 after hydrolysis.

The composite oxide fine particle formed by a sol-gel method according to the present invention is preferably in the form of sphere for increasing its packing density in the thin electrode material layer to prevent the ambient members from scratching due to the particle.

In order to prepare a spherical particle, an interfacial reaction described in the above described JP-A-64-42316 is preferably employed. The size of the spherical particle is preferably from 0.005 to 1.0 μm, particularly preferably from 0.01 to 0.5 μm for a primary particle and from 0.1 to 50 μm, particularly preferably from 0.5 to 10 μm for a secondary particle (aggregate particle) as calculated in terms of average particle diameter. The secondary particle is an aggregate of a fine particle and thus has a great specific surface area for the size thereof.

The fine particle may be in amorphous, tabular, acicular or fibrous form other than spherical form.

The composite oxide fine particle formed by a sol-gel method according to the present invention preferably has a specific surface area according to a BET method of at least 2 m$^2$/g, more preferably not less than 5 m$^2$/g, most preferably not less than 10 m$^2$/g in order to increase an effective surface area of the particle influencing on the intercalation and deintercalation of lithium ion as an electrode material and thus act efficiently in rapid intercalation/deintercalation reaction (i.e., rapid charge-discharge).

In order to obtain a group of particles having a great BET specific surface area, the composite oxide fine particle of the present invention has a porous surface structure. The presence or absence of such a porous structure can be examined by observation of particles under an electron microscope. The diameter of micropores in the surface of the porous particles preferably falls within the range of from 10 Å to 1,000 Å.

The composite metal oxide to be used as an electrode material for a lithium ion secondary battery synthesized by a sol-gel method according to the present invention has an amorphous structure, which comprises at least one functional element, as a metal, effecting the electrochemical intercalation/deintercalation of lithium ion, selected from the group consisting of tin, lead, germanium and transition metals; and at least one element effective for obtaining amorphous structure selected from the group consisting of aluminum, boron, phosphorus, silicon, elements belonging to the groups I, II, XIII, XIV and XV in the periodic table, and halogen elements. The composite metal oxide synthesized by a sol-gel method is incorporated in a negative electrode material for a lithium ion secondary battery (i.e., negative electrode active material or precursor thereof) at least partly, preferably in an amount of not less than 10% by weight based on the weight thereof.

Particularly effective among the foregoing functional elements is tin. A preferred example of the composite oxide is a composite oxide containing an amorphous structure which comprises tin as a main component and at least one element selected from the group consisting of elements belonging to the groups I, II, XIII, XIV and XV in the periodic table, transition metal, and halogen elements. More preferably, the composite oxide contains an amorphous structure which comprises tin as a main component and at least one element selected from the group consisting of lead, germanium, boron, phosphorus, silicon, aluminum, and elements belonging to the groups I and II in the periodic table.

Particularly preferably, the composite oxide does not contain substantially aluminum, as described hereafter.

The composite metal oxide containing an amorphous structure which comprises tin as a main component preferably has a chemical structure represented by formula (I):

$$Sn_xM^1_{1-x}M^2_yO_2 \tag{I}$$

wherein $M^1$ represents at least one element selected from the group consisting of Mn, Fe, Pb and Ge; $M^2$ represents two or more elements selected from the group consisting of Al, B, P, Si, elements belonging to the groups I, II and III in the periodic table, and halogen elements; and x, y and z satisfy the following relationships, $0 < x \leq 1$, $0.1 \leq y \leq 3$ and $1 \leq z \leq 8$.

Referring to a more desirable composition according to the foregoing structural formula, $M^1$ is at least one element selected from the group consisting of Pb and Ge, and $M^2$'s are two or more elements selected from the group consisting of B, P, Si, and elements belonging to the groups I and II in the periodic table. In particular, $M^2$'s are preferably elements other than Al. A material containing Al in a large amount is liable to generate problems such as decrease of capacity as a negative electrode material. Further, a material to be calcined by a melt process can be easily contaminated by Al produced by erosion of the material of the calcining container. The contamination by Al often has an adverse effect on performance of electrode.

It is known that the tin element contained in the negative electrode material of the present invention has an electronic oxidation-reduction state to three kinds of zero-, di- and tetra-valent elements.

In the present invention, the state of tin contained in the negative electrode material is mainly di-valence or tetra-valence. That is, the state of the di-valence or tetra-valence means at least 80% or more (preferably at least 90% or more) of the total amount of tin contained in the negative electrode material is di-valence or tetra-valence.

The valence of tin can be measured by an oxidation-reduction titration method and the Mössbauer spectral analysis method.

The oxidation-reduction titration method is carried out as follows.

For example, the composite oxide material is dissolved with an inorganic acid such as sulfuric acid and fluoric acid, the total amount of the dissolved composite oxide material is oxidized with the determined amount of potassium bichromate, and then the residual amount (i.e., the amount of the unreacted potassium bichromate) of the potassium bichromate is subjected to the back-titration with sodium thiosulfate using a starch solution as an indicator.

The foregoing composite oxide of the present invention contains an amorphous structure in its structure or is amorphous. The term "containing an amorphous structure" as used herein means that the composite oxide of the present invention has a diffraction scattering zone having a broad peak with a weak intensity in the range of from 20° to 40° in terms of a 2θ value as determined by X-ray diffractometry with CuKα rays. This broad-scattering zone may have crystalline diffraction lines. This crystalline line reflects a structural portion having a little order in the amorphous structure. If crystalline diffraction lines are observed in the range of from 40° to 70° in terms of a 2θ value, the strongest intensity of these crystalline diffraction lines is preferably not more than 500 times, more preferably not more than 100 times, particularly preferably not more than 5 times that of the peak diffraction line in the foregoing broad scattering-zone observed in the range of from 20° to 40° in terms of a 2θ value. Most preferably, this broad scattering zone has no crystalline diffraction lines.

The composite oxide of the present invention preferably is amorphous. However, the amorphous structure produced by a sol-gel method is not completely amorphous but contains a small amount of crystalline components. Therefore, the composite oxide of the present invention may contain crystalline components as far as it goes.

The composite oxide of the present invention is mainly composed of those containing an amorphous structure produced by a sol-gel method but may contain an amorphous structure produced by calcining method. In this case, the amorphous structure produced by calcining method may be incorporated in the composite oxide in an amount of not more than 50% by weight, preferably not more than 20% by weight based on the weight thereof.

Preferred examples of the composite metal oxide synthesized according to the present invention are shown below.

$PbSi_{0.5}B_{0.2}P_{0.2}O_{1.85}$
$PbK_{0.1}Si_{0.8}P_{0.2}O_{1.95}$
$FeK_{0.1}Si_{0.8}P_{0.2}O_{1.95}$
$MnB_{0.5}P_{0.5}O_3$
$GeSi_{0.5}B_{0.2}P_{0.2}O_{1.85}$
$SnSi_{0.8}P_{0.2}O_{3.1}$
$SnSi_{0.5}B_{0.2}P_{0.2}O_{1.85}$
$SnSi_{0.8}B_{0.2}O_{2.9}$
$SnSi_{0.8}Al_{0.2}O_{2.9}$
$SnSi_{0.6}Al_{0.1}B_{0.2}O_{1.65}$
$SnSi_{0.3}Al_{0.1}P_{0.6}O_{2.25}$
$SnSi_{0.4}B_{0.2}P_{0.4}O_{2.1}$
$SnSi_{0.6}Al_{0.1}B_{0.5}O_{2.1}$
$SnB_{0.5}P_{0.5}O_3$
$SnK_{0.2}PO_{3.6}$
$SnRb_{0.2}P_{0.8}O_{3.2}$
$SnBa_{0.1}P_{1.45}O_{4.5}$
$SnLa_{0.1}P_{0.9}O_{3.4}$
$SnNa_{0.1}B_{0.45}O_{1.75}$
$SnLi_{0.2}B_{0.5}P_{0.5}O_{3.1}$
$SnCs_{0.1}B_{0.4}P_{0.4}O_{2.65}$
$SnBa_{0.1}B_{0.4}P_{0.4}O_{2.7}$
$SnCa_{0.1}Al_{0.15}B_{0.45}P_{0.55}O_{3.9}$
$SnY_{0.1}B_{0.6}P_{0.6}O_{3.55}$
$SnRb_{0.2}B_{0.3}P_{0.4}O_{2.55}$
$SnCs_{0.2}B_{0.3}P_{0.4}O_{2.55}$
$SnCs_{0.1}B_{0.4}P_{0.4}O_{2.65}$
$SnK_{0.1}Cs_{0.1}B_{0.4}P_{0.4}O_{2.7}$
$SnBa_{0.1}Cs_{0.1}B_{0.4}P_{0.4}O_{2.75}$
$SnMg_{0.1}K_{0.1}B_{0.4}P_{0.4}O_{2.75}$
$SnCa_{0.1}K_{0.1}B_{0.4}P_{0.5}O_3$
$SnBa_{0.1}K_{0.1}Al_{0.1}B_{0.3}P_{0.4}O_{2.75}$
$SnMg_{0.1}Cs_{0.1}Al_{0.1}B_{0.3}P_{0.4}O_{2.75}$
$SnCa_{0.1}K_{0.1}Al_{0.1}B_{0.3}P_{0.4}O_{2.75}$
$SnMg_{0.1}Rb_{0.1}Al_{0.1}B_{0.3}P_{0.4}O_{2.75}$
$SnCa_{0.1}B_{0.2}P_{0.2}F_{0.2}O_{2.6}$
$SnMg_{0.1}Cs_{0.1}B_{0.4}P_{0.4}F_{0.2}O_{3.3}$
$Sn_{0.5}Mn_{0.5}Mg_{0.1}B_{0.9}O_{2.45}$
$Sn_{0.5}Mn_{0.5}Ca_{0.1}P_{0.9}O_{3.35}$
$Sn_{0.5}Ge_{0.5}Mg_{0.1}P_{0.9}O_{3.35}$
$Sn_{0.5}Fe_{0.5}Ba_{0.1}P_{0.9}O_{3.35}$
$Sn_{0.8}Fe_{0.2}Ca_{0.1}P_{0.9}O_{3.35}$
$Sn_{0.3}Fe_{0.7}Ba_{0.1}P_{0.9}O_{3.35}$
$Sn_{0.9}Mn_{0.1}Mg_{0.1}P_{0.9}O_{3.35}$
$Sn_{0.2}Mn_{0.8}Mg_{0.1}P_{0.9}O_{3.35}$
$Sn_{0.7}Pb_{0.3}Ca_{0.1}P_{0.9}O_{3.35}$
$Sn_{0.2}Ge_{0.8}Ba_{0.1}P_{0.9}O_{3.35}$
$Sn_{0.1}Al_{0.1}B_{0.5}P_{0.5}O_{3.35}$
$Sn_{1.0}Cs_{0.1}Al_{0.4}B_{0.5}P_{0.5}O_{3.65}$
$Sn_{1.0}Cs_{0.1}B_{0.5}P_{0.5}O_{3.05}$
$Sn_{1.0}Cs_{0.1}Ge_{0.05}B_{0.5}P_{0.5}O_{3.15}$
$Sn_{1.0}Cs_{0.1}Ge_{0.05}Al_{0.3}B_{0.5}P_{0.5}O_{3.60}$
$SnSi_{0.8}P_{0.2}O_{4.1}$
$SnSi_{0.5}B_{0.2}P_{0.2}O_{2.85}$
$SnSi_{0.8}B_{0.2}O_{3.9}$
$SnSi_{0.8}Al_{0.2}O_{4.9}$
$SnSi_{0.6}Al_{0.1}B_{0.2}O_{2.65}$
$SnSi_{0.3}Al_{0.1}P_{0.6}O_{3.25}$
$SnSi_{0.4}B_{0.2}P_{0.4}O_{3.1}$ $SnSi_{0.6}Al_{0.1}B_{0.5}O_{3.1}$
$SnB_{0.5}P_{0.5}O_4$
$SnK_{0.2}P_{1.4}O_{4.6}$
$SnRb_{0.2}P_{0.8}O_{4.2}$
$SnBa_{0.1}P_{1.45}O_{5.5}$
$SnLa_{0.1}P_{0.9}O_{4.4}$
$SnNa_{0.1}B_{0.45}O_{2.75}$
$SnLi_{0.2}B_{0.5}P_{0.5}O_{4.1}$
$SnCs_{0.1}B_{0.4}P_{0.4}O_{3.65}$
$SnBa_{0.1}B_{0.4}P_{0.4}O_{3.7}$
$SnCa_{0.1}Al_{0.15}B_{0.45}P_{0.55}O_{4.9}$
$SnY_{0.1}B_{0.6}P_{0.6}O_{4.55}$
$SnRb_{0.2}B_{0.3}P_{0.4}O_{3.55}$
$SnCs_{0.2}B_{0.3}P_{0.4}O_{3.55}$
$SnCs_{0.1}B_{0.4}P_{0.4}O_{3.65}$
$SnK_{0.1}Cs_{0.1}B_{0.4}P_{0.4}O_{3.7}$
$SnBa_{0.1}Cs_{0.1}B_{0.4}P_{0.4}O_{3.75}$
$SnMg_{0.1}K_{0.1}B_{0.4}P_{0.4}O_{3.75}$
$SnCa_{0.1}K_{0.1}B_{0.4}P_{0.5}O_4$
$SnBa_{0.1}K_{0.1}Al_{0.1}B_{0.3}P_{0.4}O_{3.75}$
$SnMg_{0.1}Cs_{0.1}Al_{0.1}B_{0.3}P_{0.4}O_{3.75}$
$SnCa_{0.1}K_{0.1}Al_{0.1}B_{0.3}P_{0.4}O_{3.75}$
$SnMg_{0.1}Rb_{0.1}Al_{0.1}B_{0.3}P_{0.4}O_{3.75}$
$SnCa_{0.1}B_{0.2}P_{0.2}F_{0.2}O_{3.6}$
$SnMg_{0.1}Cs_{0.1}B_{0.4}P_{0.4}F_{0.2}O_{4.3}$
$Sn_{0.5}Mn_{0.5}Mg_{0.1}B_{0.9}O_{3.95}$
$Sn_{0.5}Mn_{0.5}Ca_{0.1}P_{0.9}O_{3.85}$
$Sn_{0.5}Ge_{0.5}Mg_{0.1}P_{0.9}O_{3.85}$
$Sn_{0.5}Fe_{0.5}Ba_{0.1}P_{0.9}O_{3.95}$
$Sn_{1.0}Al_{0.1}B_{0.5}P_{0.5}O_{4.15}$
$Sn_{1.0}Cs_{0.1}Al_{0.4}B_{0.5}P_{0.5}O_{4.65}$
$Sn_{1.0}Cs_{0.1}B_{0.5}P_{0.5}O_{4.05}$
$Sn_{1.0}Cs_{0.1}Ge_{0.05}B_{0.5}P_{0.5}O_{4.15}$
$Sn_{1.0}Cs_{0.1}Ge_{0.05}Al_{0.3}B_{0.5}P_{0.5}O_{4.60}$

When the negative electrode material of the present invention is synthesized in an aqueous solution by a sol-gel method, the coagulation of the fine particles is prevented by adding the water-soluble polymer to the aqueous solution and thereby the condition for forming the particles can be advantageously improved.

Examples of the water-soluble polymer which can be used in the present invention include proteins such as gelatin, a gelatin derivative, a graft polymer of gelatin and other high molecule (i.e., polymer), albumin and casein; cellulose derivatives such as hydroxyethyl cellulose, carboxymethyl cellulose and sulfuric acid cellulose ester; sugar derivatives such as sodium alginate and starch derivatives; and a homopolymer or copolymer of various hydrophilic high molecular compounds such as polyvinyl alcohol, polyethylene oxide, polyvinyl alcohol-partial acetal, polyvinyl pyrrolidone (e.g., poly-N-vinyl pyrrolidone), polyacrylic acid, polymethacrylic acid, polyacrylamide, polyvinylimidazole and polyvinylpyrazole.

These water-soluble polymers are assumed to act as a protective colloid.

Among these water-soluble polymers, gelatin, polyethylene oxide, polyvinyl alcohol, carboxymethyl cellulose and polyvinyl pyrrolidone are particularly preferred.

Representative method for synthesizing the negative electrode material using the water-soluble polymer in the present invention is as follows.

First, a sol of the composite oxide particle containing tin and at least one element selected from the group consisting of elements belonging to the groups I, II, XIII, XIV and XV in the periodic table, transition metal and halogen elements is synthesized by a sol-gel method using a tin-containing compound as a kind of starting material in a solution.

Second, the obtained sol is added dropwise to an aqueous solution containing a water-soluble polymer while stirring to proceed a sol-reaction in an aqueous solution in which the water-soluble polymer is present as a protective colloid. As a result, a granular gel comprising a tin-composite oxide (i.e., a tin-containing composite oxide) is formed.

Then, by heat-drying the obtained gel, the composite metal oxide particle containing an amorphous structure which comprises tin as a main component and at least one element selected from the group consisting of elements belonging to the groups I, II, XIII, XIV and XV in the periodic table, transition metal, and halogen elements is synthesized as the negative electrode material.

As the starting material required for the synthesis of the foregoing compound by the sol-gel method there may be mainly used an alkoxide of metal element and semi-metal element constituting the composition, derivative thereof, halide or inorganic salt. The acidic or basic catalyst may be used in the reaction system. As the reaction solvent there may be used one miscible with water. Specific examples of such the solvent include alcohols such as methanol, ethanol, propanol, butanol, pentanol and hexanol, and ethylene glycol derivatives such as ethylene glycol, ethylene glycol monoethyl ether and ethylene glycol acetate. Other examples of solvent which can be used herein include diacetoalcohol, acetone, methyl ethyl ketone, tetrahydrofuran, cyclohexane and toluene.

Examples of alkoxides which are preferably used in the synthesis according to the present invention include silicon starting materials such as alkoxysilane and derivatives thereof (e.g., tetraethoxysilane, tetramethoxysilane, tetrapropoxysilane, tetrabutoxysilane, monomethyltriethoxysilane and tetraphenoxysilane). Representative among these materials are hydrolyzate of tetraethoxysilane and tetraethoxysilane from the standpoint of storage stability. Examples of tin starting materials which can be used herein include diethoxytin, dimethoxytin, tetraethoxytin, tetramethoxytin, and tetrapropoxytin. As other starting materials there may be used trimethoxyboron, triethoxyboron, triethoxyaluminum, etc. Examples of metal salts which are preferably used for the synthesis according to the present invention include stannous chloride, stannic chloride, silicon chloride, germanium chloride, tin acetate, sodium germanate, and sodium silicate. Among these metal salts, stannous chloride and stannic chloride are preferably used. Examples of acids which are preferably used for the synthesis according to the present invention include boric acid, silicic acid, phosphoric acid, and germanic acid.

The negative electrode material in the form of gel synthesized according to the present invention is heated and dried so that it is dehydrated. If necessary, the aggregate is ground by a grinding machine to obtain a final product in powder form. The heating and drying treatment is normally effected at a temperature of from 200° C. to 400° C., preferably in an atmosphere of inert gas such as nitrogen and argon, for 1 to 3 days. By controlling the atmosphere (partial oxygen pressure, pressure, etc.) in which the drying is effected, the properties (e.g., oxidizability, reducibility) of the final product as a negative electrode material can be improved.

The final product obtained in powder or aggregate state may be further subjected to annealing at a high temperature of not lower than 400° C. or partial re-melting at a high temperature of not lower than 600° C. followed by re-grinding to powder to modify the desired product.

The amorphous composite metal oxide synthesized by a sol-gel method according to the present invention is used as a negative electrode material for nonaqueous electrolytic solution lithium ion secondary battery. It is capable of reversibly intercalating and deintercalating lithium ion when electrochemical charge/discharge reaction takes place in the battery comprising a nonaqueous electrolytic solution incorporated therein.

A lithium ion nonaqueous electrolyte secondary battery essentially comprises a positive electrode active material, a negative electrode active material and a nonaqueous electrolyte containing a lithium salt. The negative electrode active material can be obtained by the electrochemical incorporation of lithium ion into a composite metal oxide having an amorphous structure synthesized according to the present invention as an active material precursor.

As the positive electrode active material for secondary battery there is preferably used any lithium-containing composite inorganic oxide capable of deintercalating lithium ion. Particularly preferred examples of positive electrode active material include lamellar compound having $LiCoO_2$ as a skeleton composition, lamellar compound having $LiNiO_2$ as a skeleton composition, spinnel structure compound having $LiMn_2O_4$ as a skeleton composition, and compound having $LiMnO_2$ as a skeleton composition. These compounds are normally crystalline compounds. However, compounds of the series having a low crystallinity may be used for positive electrode. Particularly preferred among these compounds is a solid solution of $LiCoO_2$, which has a high average potential, stability and capacity, and other metallic elements. As the material to be used in the form of solid solution there may be used, e.g., $Li_xCo_yNi_zO_2$ (in which x, y and z satisfy the following relationships, $0.5<x\leq1$, $0\leq y\leq1$ and $0\leq z\leq1$). As a dopant for Co there may be preferably used a solid solution having various transition metals, non-transition metals, alkaline elements, rare earth elements, etc. Further, composite lithium manganese oxides, which have a high potential arid are advantageous in cost, are useful as a positive electrode active material. In particular, spinnel type composite manganese oxides are desirable. Other useful examples of composite manganese oxide than the foregoing compounds include $Li_{1+x}Mn_2O_4$ (in which x satisfies the relationship, $0\leq x\leq0.5$) produced by the incorporation of Li in $LiMn_2O_4$.

Examples of negative electrode active materials which can be used with the negative electrode material synthesized according to the process of the present invention in the production of secondary battery include lithium metal, lithium alloys as described above, and carbonaceous compounds capable of intercalating and deintercalating lithium ion or lithium metal (as disclosed in JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, JP-A-1-274360). The purpose of using lithium metal or lithium alloy is to incorporate lithium ion in the battery, but the purpose is not to utilize a dissolution-precipitation reaction of lithium metal or the like as a battery reaction.

The electrode material mixture may comprise an electrically conductive agent, a binder, a filler, etc. As such the electrically conductive agent there may be used any electrically-conductive material which undergoes no chemical change in the battery thus assembled. Examples of such the electrically-conductive material include graphites such as natural graphite (e.g., flake graphite, scaly graphite, earthy graphite) and artificial graphite, carbon black, acetylene black, ketjen black, carbon fiber, metal powder (e.g., copper, nickel, aluminum, silver (JP-A-63-148554)), metallic fiber and polyphenylene derivative (JP-A-59-20971). These electrically-conductive materials can be incorporated in the electrode material mixture singly or in admixture. In particular, the combined use of graphite and acetylene black is desirable. The amount of such the electrically-conductive material to be added is not specifically limited. In practice, however, it is preferably from 1 to 50% by weight, particularly from 2 to 30% by weight. If carbon or graphite is used, its amount is particularly preferably from 2 to 15% by weight.

Examples of the binder which can be used herein include polysaccharides, thermoplastic resins, and polymers having rubber elasticity such as starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene terpolymer (EPDM), sulfonated EPDM, styrene butadiene rubber, polybutadiene, fluororubber and polyethylene oxide. These compounds may be used singly or in admixture. The amount of such the binder to be added is preferably from 2 to 30% by weight. As the filler-which can be used herein there may be used any fibrous material which undergoes no chemical change in the battery thus assembled. In general, an olefinic polymer such as polypropylene and polyethylene, glass fiber, carbon fiber, etc. may be used. The amount of the filler to be added is not specifically limited. In practice, however, it is preferably from 0 to 30% by weight.

The nonaqueous electrolytic solution which can be used in the production of secondary battery preferably comprises a mixture of at least one of aprotic organic solvents such as propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, methyl formate, methyl acetate, triester phosphate (JP-A-60-23973), trimethoxymethane (JP-A-61-4170), dioxolan derivative (JP-A-62-15771, JP-A-62-22372, JP-A-62-108474), sulfolan (JP-A-62-31959), 3-methyl-2-oxazolidinone (JP-A-62-44961), propylene carbonate derivative (JP-A-62-290069, JP-A-62-290071), tetrahydrofuran derivative (JP-A-63-32872), diethyl ether (JP-A-63-62166) and 1,3-propane sultone (JP-A-63-102173) and one or more lithium salts soluble in the solvent such as $LiClO_4$, $LiBF_6$, $LiPF_6$, $LiCF_3SO_3$, $LiCF_3CO_2$, $LiAsF_6$, $LiSbF_6$, $LiB_{10}Cl_{10}$ (JP-A-57-74974), lower aliphatic lithium carboxylate (JP-A-60-41773), $LiAlCl_4$, LiCl, LiBr, LiI (JP-A-60-247265), chloroboran lithium (JP-A-61-165957) and lithium tetraphenylborate (JP-A-61-214376). Particularly preferred among these electrolytes is an electrolyte comprising $LiCF_3SO_3$, $LiClO_4$, $LiBF_4$ and/or $LiPF_6$ dissolved in a mixture of propylene carbonate or ethylene carbonate and 1,2-dimethoxyethane and/or diethyl carbonate. The amount of such the electrolyte to be incorporated in the battery is not specifically limited. In practice, however, it may be as much as necessary depending on the amount of the positive electrode active material or negative electrode active material or the battery size. The volumetric ratio of the solvent is not specifically limited. In practice, however, if a mixture of propylene carbonate or ethylene carbonate and 1,2-dimethoxyethane and/or diethyl carbonate is used, the volumetric ratio is preferably from 0.4/0.6 to 0.6/0.4 (if 1,2-dimethoxyethane and diethyl carbonate are used in combination, the volumetric ratio is from 0.4/0.6 to 0.6/0.4). The concentration of the supporting electrolyte is not specifically limited. In practice, however, it is preferably from 0.2 to 3 mols per l of the electrolytic solution.

Besides the foregoing electrolytic solution the following organic solid electrolytes may be used. Examples of organic solid electrolytes which can be used herein include polyethylene oxide derivatives or polymers containing such the derivatives (JP-A-63-135447), polypropylene oxide derivatives or polymers containing such the derivatives, polymers containing ion dissociating groups (JP-A-62-254302, JP-A-62-254303, JP-A-63-193954), mixture of polymer containing ion dissociating groups and the foregoing aprotic electrolytic solution (U.S. Pat. Nos. 4,792,504 and 4,830,939, JP-A-62-22375, JP-A-62-22376, JP-A-63-22375, JP-A-63-22776, JP-A-1-95117), and phosphoric acid ester polymers (JP-A-61-256573). A polyacrylonitrile may be incorporated in the electrolytic solution (JP-A-62-278774). Further, the combined use of an inorganic solid electrolyte and an organic solid electrolyte is known (JP-A-60-1768).

As the separator to be assembled into the battery there may be used an insulating thin film having a great ion permeability and a predetermined mechanical strength. From the standpoint of organic solvent resistance and hydrophobicity, a sheet or nonwoven fabric made of an olefinic polymer such as polypropylene, glass fiber or polyethylene may be used. The diameter of the pores in the separator falls within the range used in ordinary battery separators, e.g., from 0.01 to 10 µm. The thickness of the separator falls within the range used in ordinary battery separators, e.g., from 5 to 300 µm.

If a solid electrolyte such as polymer is used as an electrolyte, it may also serve as a separator.

For the purpose of improving the discharge or charge-discharge characteristics of the battery, the following compounds may be incorporated-in the electrolyte. Examples of these compounds include pyridine (JP-A-49-108525), triethyl phosphite (JP-A-47-4376), triethanolamine (JP-A-52-72425), cyclic ether (JP-A-57-152684), ethylenediamine (JP-A-58-87777), n-glyme (JP-A-58-87778), triamide hexaphosphate (JP-A-58-87779), nitrobenzene derivative (JP-A-58-214281), sulfur (JP-A-59-8280), quinoneimine dye (JP-A-59-68184), N-substituted oxazolidinone and N,N'-substituted imidazolidinone (JP-A-59-154778), ethylene glycol dialkyl ether (JP-A-59-205167), quaternary ammonium salt (JP-A-60-30065), polyethylene glycol (JP-A-60-41773), pyrrole (JP-A-60-79677), 2-methoxyethanol (JP-A-60-89075), aluminum trichloride (JP-A-61-88466), monomer of electrically-conductive polymer electrode active material (JP-A-61-161673), triethylenephosphonamide (JP-A-61-208758), trialkyl phosphine (JP-A-62-80976), morpholine (JP-A-62-80977), aryl compound containing carbonyl group (JP-A-62-86673), hexamethyl phosphoric triamide and 4-alkylmorpholine (JP-A-62-217575), bicyclic tertiary amine (JP-A-62-217578), oil (JP-A-62-287580), quaternary phosphonium salt (JP-A-63-121268), and tertiary sulfonium salt (JP-A-63-121269).

The electrolytic solution may comprise a halogen-containing solvent such as carbon tetrachloride and ethylene chloride trifluoride incorporated therein to give incombustibility (JP-A-48-36632). Further, the electrolytic solution may comprise carbon dioxide gas incorporated therein to adapt itself to storage at-high temperatures (JP-A-59-134567).

The positive and negative electrode material mixture may comprise an electrolytic solution or a supporting salt. A method incorporating the foregoing ionically-conductive polymer, nitromethane (JP-A-48-36633) or electrolytic solution (JP-A-57-124870) into the electrode material mixture is well-known.

Further, the surface of the active positive electrode material may be modified. In some detail, the surface of the metal oxide may be coated with an esterifying agent (JP-A-55-163779), a chelating agent (JP-A-55-163780), an electrically-conductive high molecular compound (JP-A-58-163188, JP-A-59-14274), a polyethylene oxide (JP-A-60-97561) or the like. Similarly, the surface of the negative electrode material may be modified. For example, an ionically-conductive polymer or polyacetylene layer may be provided on the surface of the negative electrode material (JP-A-58-111276). Alternatively, the negative electrode material may be subjected to surface treatment with a lithium salt (JP-A-58-142771).

As the current collector for electrode active material there may be used any electronic conductor which undergoes no chemical change in the battery thus assembled. For example, stainless steel, nickel, aluminum, titanium, calcined carbon, etc. may be used for positive electrode. Besides these materials, aluminum or stainless steel surface-treated with carbon, nickel, titanium or silver may be used. For negative electrode, stainless steel, nickel, copper, titanium, aluminum and calcined carbon may be used. Besides these materials, copper or stainless steel surface-treated with carbon, nickel, titanium or silver or Al-Cd alloy may be used. The surface of these materials may be oxidized. The current collector may be in the form of foil. Alternatively, the current collector may be in the form of film, sheet or net. Further, the current collector may be in punched form. Moreover, the current collector may be in the form of lath, porous material or formed fiber. The thickness of the current collector is not specifically limited. In practice, however, it may fall within the range of from 1 to 500 µm.

The battery thus assembled may have a shape such as coin, button, sheet, cylindrical and rectangular form. In the case of coin-shaped or button-shaped battery, the mixture of positive electrode active material or negative electrode active material is pressed into pellet before use. In the case of sheet-shaped, cylindrical or rectangular battery, the mixture of positive electrode active material or negative electrode active material is applied to the current collector, dried, dehydrated, and then pressed before use. The thickness of the coated mixture is determined by the battery size. In practice, however, it is preferably from 10 to 500 µm in dried compressed form.

The purpose of the nonaqueous secondary battery of the present invention is not specifically limited. For example, the nonaqueous secondary battery can be mounted in electronic apparatus such as color note personal computer, black-and-white note personal computer, pen touch personal computer, pocket (palm top) personal computer, note word processor, pocket word processor, electronic book player, portable telephone, cordless phone slave receiver, pager, handy terminal, portable facsimile, portable duplicating machine, portable printer, head phone stereo, video movie, liquid crystal television, handy cleaner, portable CD, mini disc, electric shaver, electronic translating machine, automobile telephone, transceiver, electric tool, electronic note, electronic calculator, memory card, tape recorder, radio and backup electric power. Further, the nonaqueous secondary battery can be applied to consumer products such as automobile, electric vehicle, motor, lighting fixture, toy, game machine, road conditioner, electric iron, watch, strobe, camera and medical apparatus (e.g., pace maker, hearing aid, massager). Moreover, the nonaqueous secondary battery of the present invention can be applied for various military use or cosmic use. The nonaqueous secondary battery of the present invention may be combined with solar batteries.

EXAMPLE

The present invention will be further described with reference to examples of the preparation of batteries, but the present invention should not be construed as being limited thereto.

Example 1
1) Synthesis of Sn(II)SiO$_3$ by Sol-Gel Method 0.05 mols of tetraethoxysilane, 0.05 mols of diethoxytin (II) and 5 mg of DMF (dimethylformamide) were mixed. To the mixture was then gradually added dropwise a mixture of 5 ml of methanol, 5 ml of water and 1 ml of a 0.001% aqueous ammonia water with stirring in an atmosphere of nitrogen to obtain a sol (dispersion) solution.

The thus-obtained sol (dispersion) solution was then allowed to stand at a temperature of 35° C. for 8 hours. The sol solution was heated to a temperature of 80° C. and then was allowed to stand for 8 hours for ripening to obtain a water-containing gel. The water-containing gel thus obtained was separated by decantation, filtered, and then rinsed three times. The gel thus obtained was then dried at a temperature of 120° C. for 24 hours. The gel thus dried was then heated to a temperature of 300° C. in an atmosphere of nitrogen for 12 hours. As a result, a light yellow powder having an average particle diameter of 8 µm was obtained. The powder thus obtained had a BET specific surface area of 6 m$^2$/g.

Thus, a negative electrode material A of the present invention was prepared.

2) Synthesis of Sn(IV)SiO$_4$ by Sol-Gel Method 0.05 mols of tetraethoxysilane, 0.05 mols of tetraethoxytin(IV) and 5 ml of DMF were homogeneously mixed. To the mixture was then gradually added dropwise a mixture of 5 ml of isopropanol, 5 ml of water and 1 ml of a 0.001% aqueous ammonia water with stirring in an atmosphere of nitrogen to obtain a viscous sol (dispersion) solution.

The thus-obtained sol (dispersion) solution was then allowed to stand at a temperature of 35° C. for 8 hours. The sol solution was heated to a temperature of 80° C. and then was allowed to stand for 8 hours for ripening to obtain a water-containing gel. The water-containing gel thus obtained was separated by decantation, filtered, and then rinsed three times. The gel thus obtained was then dried at a temperature of 120° C. for 24 hours. The gel thus dried was then heated to a temperature of 400° C. in an atmosphere of nitrogen for 12 hours. As a result, a light yellow powder having an average particle diameter of 8 µm was obtained. The powder thus obtained had a BET specific surface area of 10 m$^2$/g.

Thus, a negative electrode material B of the present invention was prepared.

3) Synthesis of Various Composite Tin Oxide in the Presence of Polymer (Protective Colloid) by Sol-Gel Method Negative Electrode Material C 0.05 mols of stannous chloride, 0.05 mol of tetraethoxysilane and 5 ml of DMF were homogeneously mixed. To the mixture was then gradually added dropwise a mixture of 5 ml of isopropanol, 5 ml of water and 1 ml of a 0.001% aqueous ammonia water with stirring in an atmosphere of nitrogen at 40° C. The obtained mixture was further stirred at a temperature of 40° C. for 6 hours to obtain a viscous sol (dispersion) solution.

Next, the thus-obtained sol (dispersion) solution was gradually added dropwise at a constant amount and speed from a nozzle hole to 300 ml of an aqueous solution containing a water, 10% of ammonia and 3 wt % of gelatin as a protective colloid, with stirring at a temperature of 60° C. After completion of addition of the sol solution, the obtained sol solution was heated to a temperature of 80° C. and then subjected to neutralization reaction with addition of ammonia in an atmosphere of argon gas for 3 hours to proceed gelation.

The thus-obtained reaction solution was allowed to stand at a temperature of 35° C., and then adjusted to a pH of 4 with addition of a diluted sulfuric acid to obtain a reaction product and gelatin which were precipitated.

The supernatant solution was removed from the reaction product and gelatin, and rinsed two times. Subsequently, the precipitate was heated at a temperate of 45° C., filtered, and then rinsed for removing gelatin.

The finally obtained precipitate was dried at a temperature of 200° C. for 5 hours to obtain a powdered white negative electrode material C of the present invention.

The thus-obtained powdered white material was confirmed to be SnSiO$_3$ by the ICP (Inductively Coupled Plasma) analysis.

The powdered white material was a spherical particle having a porous surface, and had an average particle size of 0.03 µm for a primary particle and an average particle size of 5 µm for a secondary particle, and a BET specific surface area of 20 m$^2$/g.

Negative Electrode Material D 0.08 mols of tetraethoxytin (IV), 0.02 mols of tetraethoxysilane and 5 ml of DMF were homogeneously mixed. To the mixture was then gradually added dropwise a mixture of 5 ml of water, 5 ml of methanol and 1 ml of a 0.001% aqueous ammonia water with stirring in an atmosphere of air at 40° C. The obtained mixture was further stirred at a temperature of 40° C. for 6 hours to obtain viscous sol (dispersion) solution.

Next, the thus-obtained sol (dispersion) solution was gradually added dropwise at constant amount and speed from a nozzle hole to 300 ml of an aqueous solution containing a water, 10% of ammonia and 5 wt % of N-vinylprrolidone (molecular weight: about 30,000) as a protective colloide, with stirring at a temperature of 60° C. After completion of addition of the sol solution, the obtained solution was heated to a temperature of 80° C. and then subjected to neutralization reaction with addition of ammonia for 3 hours to proceed-gelatin.

The thus-obtained reaction solution was allowed to stand at a temperature of 45° C. Then the precipitate was filtered and rinsed for removing a polymer.

The finally obtained precipitate was dried at a temperature of 300° C. for 5 hours to obtain a powdered white negative electrode material D of the present invention.

The thus-obtained powdered white material was confirmed to be Sn$_{0.8}$Si$_{0.2}$O$_2$ by the ICP analysis.

The powdered white material was a spherical particle having a porous surface, and had an average particle size of 0.03 µm for a primary particle and an average particle size of 3 µm for a secondary particle, and a BET specific surface area of 25 m$^2$/g.

Negative Electrode Material E

The negative electrode material was synthesized in the same manner as in the negative electrode material A, except that trimethoxyborane as a boron starting material and trimethoxyphosphine as a phosphorus starting material in addition to diethoxythin and tetraethoxysilane were used as the starting material for synthesizing a sol.

Thus, the obtained negative electrode E of the present invention was prepared.

The thus-obtained negative electrode material E was confirmed to be Sn$_{0.8}$Si$_{0.5}$B$_{0.3}$P$_{0.2}$O$_{3.55}$ by the ICP analysis.

For comparison, a comparative negative electrode material was prepared by a melting method. In some detail, silicon dioxide and stannous oxide were measured out in an amount such that the molar ratio of tin to silicon was as mentioned above. These materials were dry-mixed, and then heated to a temperature of 1,100° C. at a rate of temperature rise of 15° C./min. in an alumina crucible in an atmosphere of argon. The material was calcined at a temperature of 1,100° C. for 12 hours, cooled to room temperature at a rate of temperature drop of 10° C./min., and then taken out from the calcining furnace. The sample was ground to small masses which were then coarsely ground by means of a stone mill type grinding machine. The material was then ground by means of a jet mill as mentioned above to obtain a powder having an average particle diameter of 7.8 $\mu$m and a BET specific surface area of 0.8 $m^2$/g.

The negative electrode materials A to E and the comparative negative electrode material were each subjected to a powder X-ray analysis. Both the negative electrode materials A and B showed a broad zone having a peak in the vicinity of 28° in terms of a 2θ value as analyzed by X-ray diffractometry with CuKα rays. There were observed no crystalline lines in a range of from 40° to 70° in terms of a 2θ value.

The foregoing negative electrode materials A to E and the comparative negative electrode material were subjected to chemical analysis. As a result, it was found that the composition of the negative electrode materials A to E of the present invention coincides with that of the materials charged. On the contrary, the comparative negative electrode material was found to have aluminum incorporated therein as an impurity in an amount of about 5% by weight as calculated in terms of element.

For the evaluation of the properties of negative electrode material, a battery was prepared in the following manner.

A negative electrode material mixture each was prepared by mixing 80% by weight of the materials to A to E of the present invention and the comparative material, 9% by weight of scaly graphite as an electrically conducting agent, 5% by weight of acetylene black, and 6% by weight of a polyvinylidene fluoride as a binder. The electrode material mixture was compression-molded to pellets (13 mmφ, 22 mg) which were then dried in a dry box (dew point: −70° C. to −40° C.; dried air) under a far infrared heater (150° C., 3 hours).

A positive electrode material mixture was prepared by mixing 82% by weight of $LiCoO_2$ as an active positive electrode material, 8% by weight of scaly graphite as an electrically conductive agent, 4% by weight of acetylene black, and 6% by weight of tetrafluoroethylene as a binder. The electrode material mixture was compression-molded to obtain a pelletized positive electrode (13 mmφ; amount was adjusted to the capacity of lithium to be incorporated in the negative electrode material mixture; charging capacity of $LiCoO_2$ was 170 mAh/g) which was then dried in the same dry box as used above under a far infrared heater (150° C., 3 hours).

Figure 1:
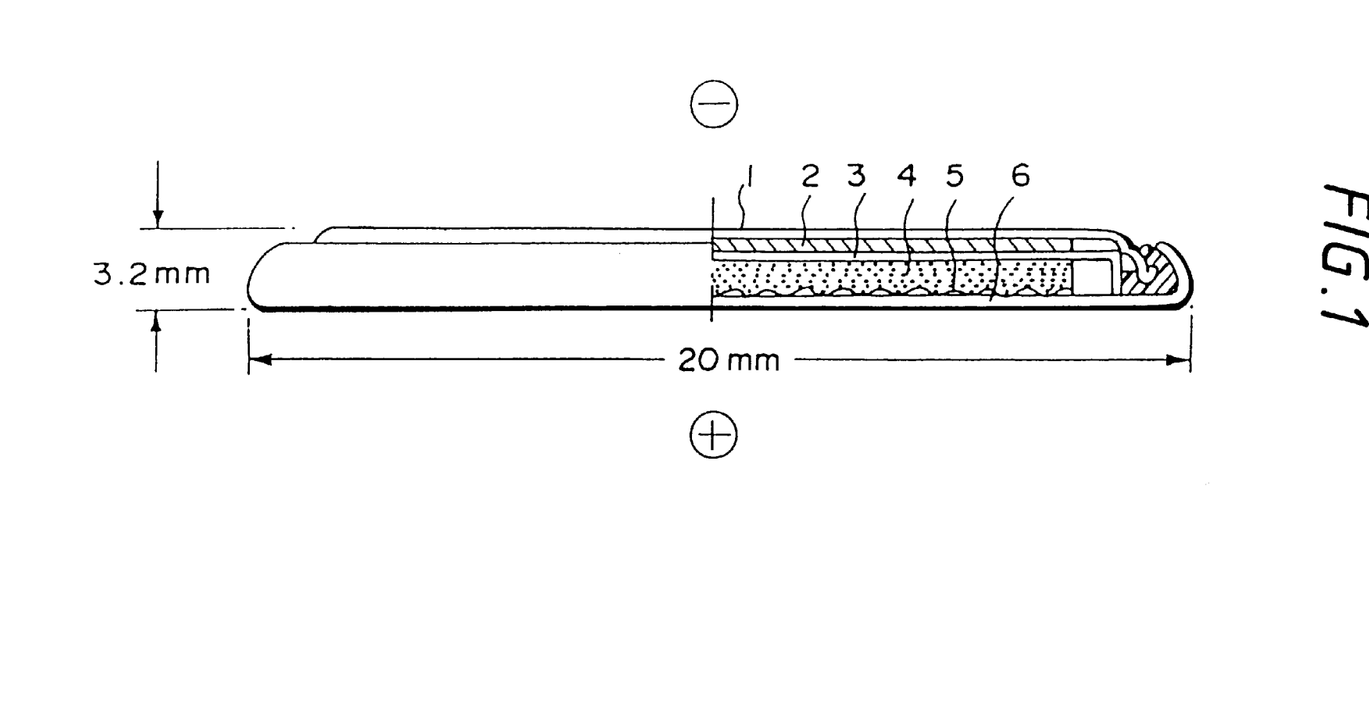
FIG. 1 is a sectional view of a coin nonaqueous secondary battery (i.e., a nonaqueous secondary battery having a coin shape) prepared according to an example of the present invention.

HAs the current collector both for positive and negative electrode cans there was used a coin can having a 80 $\mu$m thick net (made of stainless steel) welded thereto. As the electrolyte there was used 200 $\mu$l of a 1 mol/l $LiPF_6$ (in a 2:2:6 (by volume) mixture of ethylene carbonate, butylene carbonate and dimethyl carbonate). As the separators there were used a microporous polypropylene sheet and a polypropylene nonwoven fabric. The nonwoven fabric was impregnated with the electrolytic solution. A coin-shaped nonaqueous secondary battery as shown in FIG. 1 was then prepared in the same dry box as described above.

The nonaqueous secondary battery thus prepared was then subjected to charge-discharge test at a constant current density of 3.00 $mA/cm^2$ over a voltage range of from 2.6 to 4.1 V (All the charge-discharge tests began with charging). The results are shown in Table 1.

Referring to the abbreviations in Table 1, (a) indicates the reversible discharge capacity at the 1st cycle (mAh/g of negative electrode material), (b) indicates the average discharge voltage (V), and (c) indicates the high-rate discharge capacity ratio (% ratio of the capacity during discharge at a high current density of 15.0 mA to that during discharge at a low current density of 3.0 mA).

The comparative negative electrode material was similarly evaluated. The results are shown in Table 1.

As is apparent from the result of Table 1, in the negative electrode material of the present invention, contamination by impurities during its preparation is decreased, and the battery comprising the negative electrode material exhibits a high capacity and excellent high-rate discharge capacity ratio.

TABLE 1

| Negative electrode material | (a) | (b) | (c) | Remarks |
| --- | --- | --- | --- | --- |
| A | 481 | 3.52 | 93 | Invention |
| B | 475 | 3.52 | 93 | " |
| C | 483 | 3.52 | 94 | " |
| D | 500 | 3.51 | 93 | " |
| E | 479 | 3.53 | 94 | " |
| Comparative Material | 445 | 3.45 | 87 | Comparison |

Example 2 (Synthesis of Spherical Negative Electrode Material)

0.05 mols of tetraethoxysilane, 0.01 mols of trimethoxyboran, 0.01 mols of trimethoxyphosphine, 0.05 mols of diacetylacetonatotin and 5 ml of DMF were mixed. To the mixture was then gradually added dropwise a mixture of 2 ml of methanol, 10 ml of water and 0.1 ml of a 0.1% sorbitan monoleate solution with stirring in an atmosphere of nitrogen to obtain a viscous sol (dispersion) solution.

The solution thus obtained was allowed to stand at a temperature of 35° C. for 3 hours, added to the same volume of perchloroethylene, and then subjected to emulsification with stirring at 300 rpm by means of a desorber.

After 15 minutes of stirring, ammonia gas was introduced into the container from the top thereof at a rate of 500 ml/min. for 10 minutes. The emulsion was further stirred for 30 minutes.

The slurry thus obtained was then subjected to distillation by a reduced pressure type solvent-removing apparatus to remove the solvent therefrom. The powder thus obtained was then dried at a temperature of 120° C. in a dryer for 12 hours and then at a temperature of 300° C. in an atmosphere of nitrogen for 24 hours to obtain a powdered negative electrode active material E.

The powder thus obtained exhibited an average particle diameter of 3 $\mu$m and a BET specific surface area of 10 $m^2$/g.

As a comparative negative electrode material there was used the same comparative negative electrode material as used in Example 1.

The negative electrode materials thus obtained were then observed under a scanning electron microscope. As a result, it was found that the negative electrode material F according to the present invention is a spherical particle having a porous surface while the comparative negative electrode material is an irregular rock-shaped material having acute corners and a nonporous surface.

83% by weight of the negative electrode material F according to the present invention, 9% by weight of scaly graphite, and 3% by weight of acetylene black were mixed. To the mixture were then added 4% by weight of a water dispersion of a polyvinylidene fluoride and 1% by weight of carboxymethyl cellulose as binders. The mixture was then kneaded with water as a medium to prepare a slurry. The pH value of the slurry was adjusted to 7.0. The slurry thus obtained was applied to a 18 μm thick copper foil on both sides thereof by an extrusion method, and then dried. The coated copper foil was compression-molded by a calender press, and then cut into a belt having a predetermined width and length. Thus, a belt-like negative electrode sheet was obtained. The length of the negative electrode sheet was predetermined such that the sheet can be housed in the battery can in view of the thickness thereof.

92% by weight of $LiCoO_2$ as a positive electrode active material, 3% by weight of acetylene black, 3% by weight of a water dispersion of a polytetrafluoroethylene, 1% by weight of sodium polyacrylate and 1% by weight of sodium bicarbonate as binders, and water as a medium were kneaded to obtain a slurry. The slurry thus obtained was applied to a 20 μm thick aluminum foil on both sides thereof by the same method as used above, and then dried. The coated aluminum foil was pressed, and then cut. As a result, a belt-like positive electrode sheet having an electrode material mixture thickness of 220 μm was prepared.

Figure 2:
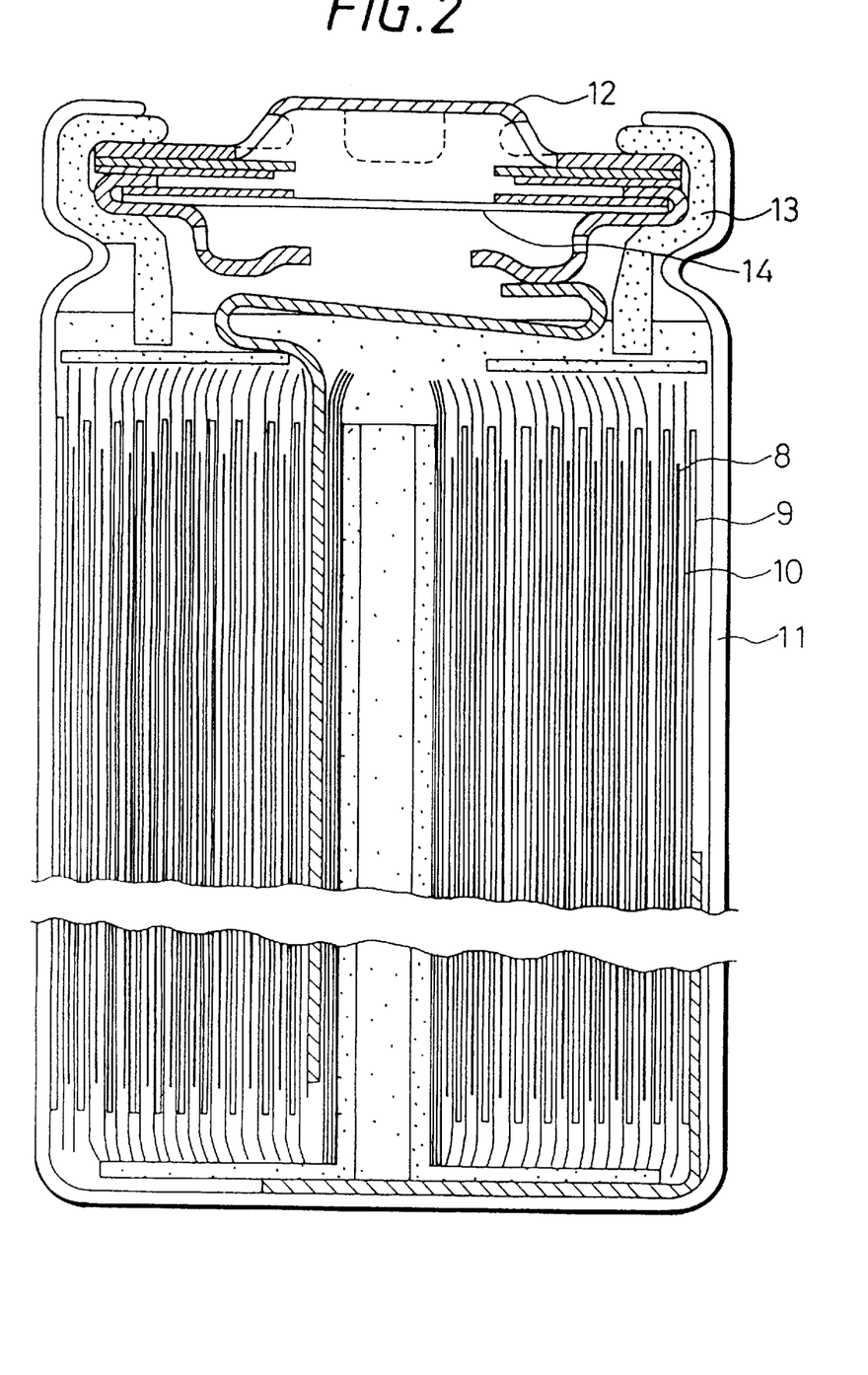

A nickel lead plate and an aluminum lead plate were then spot-welded to an end of the foregoing negative electrode sheet and positive electrode sheet, respectively. These sheets were then subjected to dehydration and drying at 230° C. in dried air having a dew point of not higher than −40° C. for 2 hours. The positive electrode sheet (8) thus dehydrated and dried, a microporous polypropylene film separator, the negative electrode sheet (9) thus dehydrated and dried, and a separator (10) were then laminated in this order. The laminate was the spirally wound by a winding machine.

The wound element thus obtained was then inserted in a closed-end cylindrical nickel-plated iron battery can (11) which also serves as a negative electrode terminal. A 1 mol/l $LiPF_6$ solution (in a 2:8 (by volume) mixture of ethylene carbonate and diethyl carbonate) was then injected into the battery can as an electrolyte. The open end of the battery can was then cramped on a battery lid (12) having a positive electrode terminal with a gasket (13) provided interposed therebetween to prepare a cylindrical battery. The positive electrode terminal (12) and the battery can (11) had previously been connected to the positive electrode sheet (8) and the negative electrode sheet (9), respectively, via a lead terminal. FIG. 2 shows a section of the cylindrical battery. The reference numeral (14) indicates an explosion-proof valve.

The batteries thus prepared were subjected to charge-discharging at a current density of 1 mA/cm over a voltage range of from 2.6 to 4.1 V.

The properties of the battery thus prepared are shown in Table 2. As is apparent from the results in Table 2, the negative electrode sheet comprising the spherical particulate negative material F of the present invention exhibits an enhanced packing density of negative material as compared with the negative electrode sheet comprising the comparative negative electrode material. Thus, if the negative electrode material of the-present invention is applied in the same amount and manner as the comparative negative electrode material, its layer thickness can be reduced. As a result, the maximum length of the electrode which can be inserted into the battery can could be increased.

Table 2 shows the capacity of the batteries thus prepared. As is apparent from the results in Table 2, the battery according to the present invention exhibits a high discharge capacity.

TABLE 2

| Battery No. | Negative electrode material | Thickness of negative electrode sheet (thickness of both surface sides) | Length of negative electrode sheet | Discharge energy | High-rate ratio (%) | Remark |
| --- | --- | --- | --- | --- | --- | --- |
| 1 | F | 98 μm | 4.8 m | 5.3 Wh | 92 | Invention |
| 2 | Comparative material | 108 μm | 4.5 m | 5.0 Wh | 89 | Comparison |

Example 3

0.05 mols of tetraethoxysilane, 0.05 mols of diethoxylead (II) and 5 ml of DMF were mixed. To the mixture was then gradually added dropwise a mixture of 5 ml of methanol, 6 ml of water and 1 ml of a 0.001% ammonia water.

The solution thus obtained was then allowed to stand at a temperature of 35° C. for 8 hours. The solution was heated to a temperature of 80° C. and then was then allowed to stand for 8 hours for ripening. The water-containing gel thus obtained was then dried at a temperature of 120° C. for 24 hours. The dried gel was then ground. The powder thus obtained was melted at a temperature of 1,000° C. in a platinum crucible for 3 hours, and then cooled to prepare a glass mass. The glass mass thus obtained was then subjected to grinding by a grinding machine in the same manner as in Example 1 to obtain a powdered negative electrode material G having an average particle diameter of 8 μm and a BET specific surface area of 6 $m^2/g$.

For comparison, 0.05 mols of lead monoxide and 0.05 mols of silicon dioxide were mixed in powder form, melted in a platinum crucible in the same manner as described above, and then processed in the same manner as described above to obtain a negative electrode material R.

The platinum crucibles used for melting above were washed with hydrofluoric acid, and then examined for corrosion. As a result, the crucible in which the material G obtained by a sol-gel method according to the present invention had been melted was found to have little corrosion while the crucible in which the starting material powder was directly melted found to have remarkable corrosion and could no longer be used.

The negative electrode materials thus obtained were each used to prepare a coin-shaped battery in the same manner as in Example 1. The results of evaluation of the battery are shown in Table 3.

The results show that the negative electrode material which was synthesized by the sol-gel method of the present invention exhibits excellent charge-discharge characteristics as compared with the negative electrode material which was synthesized by the direct melting of the starting powder.

TABLE 3

| Negative electrode material | (a) | (b) | (c) | Remarks |
|---|---|---|---|---|
| G | 481 | 3.67 | 90 | Invention |
| R | 476 | 3.64 | 87 | Comparison |

Example 4 (Negative Electrode Materials Having Various compositions)

The same synthesis procedure as in Example 1 was carried out, except that compounds shown in Table 4 were used instead of tetraethoxysilane and diethoxytin (II). Thus, negative electrode materials H to M according to the present invention were prepared.

All these negative electrode materials were each then assembled into a coin shaped battery in the same manner as in Example 1. The battery was then evaluated for charge-discharge characteristics. The results are shown in Table 4. The cycle life as used herein mean the number of cycles required until 60% of the discharge capacity at 1st cycle is reached.

The results show that the negative electrode materials prepared according to the present invention can provide a nonaqueous secondary battery excellent also in cycle characteristics. It is also made clear that those comprising tin, preferably further phosphorus and boron, can provide a nonaqueous secondary battery having good properties.

TABLE 4

| No. | Sol-forming compound | Discharge capacity (mAh/g) | Cycle life (times) |
|---|---|---|---|
| H | Tetramethoxysilane: 0.05 mols<br>Diisopropylstannan: 0.05 mols | 430 | 550 |
| I | Tetramethoxysilane: 0.05 mols<br>Diethoxyplumbon: 0.05 mols | 350 | 350 |
| J | Tetramethoxysilane: 0.025 mols<br>Trimethoxyboran: 0.01 mols<br>Diethoxystannan: 0.05 mols<br>Trimethoxyphosphine: 0.01 mols | 420 | 541 |
| K | Tetramethoxysilane: 0.05 mols<br>Triemethoxyboran: 0.01 mols<br>Diethoxystannan: 0.05 mols<br>Triethoxyphosphine: 0.01 mols<br>Cesium ethoxide: 0.005 mols | 437 | 708 |
| L | Tetramethoxysilane: 0.05 mols<br>Diisopropylstannan: 0.025 mols<br>Diisopropylplumbon: 0.025 mols | 405 | 501 |
| M | Tetramethoxysilane: 0.05 mols<br>Diethoxyzinc: 0.05 mols | 380 | 305 |

Example 5

0.05 mols of stannic chloride dihydrate were dissolved in 200 ml of methanol. To the solution were then added 0.05 mols of tetraethoxysilane with stirring. To the mixture was then added 6.8 g of a 25% ammonia water. The mixture was then allowed to stand at a temperature of 40° C. for 1 hour. To the mixture was then added three-fold amount of water. The mixture was filtered. This procedure was repeated twice. The material was allowed to stand at a temperature of 80° C. for 24 hours, and then heated to a temperature of 120° C. for 3 hours and then to a temperature of 800° C. for 24 hours to obtain a glass mass. The glass mass thus obtained was then processed in the same manner as in Example 1 to obtain a powdered negative electrode material N.

The negative electrode material N was then assembled into a coin-shaped battery in the same manner as in Example 1 except that as the positive electrode material there was used $LiMn_2O_4$. The battery thus prepared was then examined for battery properties. As a result, it was confirmed that the battery exhibits excellent cycle characteristics as in Example 1.

As mentioned above, by the present invention regarding the synthesis of a composite oxide containing an amorphous structure which comprises a composite metal oxide by a sol-gel method, a nonaqutesous secondary battery having a high discharge capacity and excellent high rate characteristics can be obtained.

While the invention has been described in detail and with reference to specific embodiments thereof, it will be apparent to one skilled in the art that various changes and modifications can be made therein without departing from the spirit and scope thereof.

What is claimed is:

1. A negative electrode material for a lithium ion non-aqueous secondary battery, comprising a composite metal oxide containing an amorphous structure which comprises tin as a main component and at least one element selected from the group consisting of elements belonging to the groups I, II, XIII, XIV and XV in the periodic table, transition metal elements and halogen elements, at least a part of said composite metal oxide comprising a particle synthesized from a tin-containing compound as a starting material by a sol-gel method, wherein said particle is a secondary spherical particle having an average particle diameter of from 0.1 µm to 50 µm, is an aggregate particle of a primary particle and is a porous particle having a specific surface area by a BET method of not less than 2 m²/g.

2. The negative electrode material for a lithium ion nonaqueous secondary battery as in claim 1, wherein said composite metal oxide is a composite oxide containing an amorphous structure which comprises tin as a main component and at least one element selected from the group consisting of lead, germanium, boron, phosphorus, silicon, aluminum, and elements belonging to the groups I and II in the periodic table.

3. The negative electrode material for a lithium ion nonaqueous secondary battery as in claim 1, wherein said composite metal oxide is an amorphous composite oxide represented by formula (I)

$$Sn_xM^1_{1-x}M^2_yO_z \qquad (I)$$

wherein $M^1$ represents at least one element selected from the group consisting of Mn, Fe, Pb and Ge; $M^2$ represents two or more elements selected from the group consisting of Al, B, P, Si, elements belonging to the groups I to III in the periodic table, and halogen elements; and x, y and z satisfy the following relationships, $0<x\leq1$, $0.1\leq y\leq3$ and $1\leq z\leq8$, and is capable of intercalating lithium.

4. The negative electrode material for a lithium ion nonaqueous secondary battery as in claim 1, wherein said composite metal oxide is a composite oxide containing an amorphous structure which comprises tin as a main component and at least one element selected from the group consisting of lead, germanium, boron, phosphorus, and elements belonging to the groups I and II in the periodic table and is substantially free of aluminum.